United States Patent Office 2,904,433
Patented Sept. 15, 1959

2,904,433
PROCESS OF PRODUCING ANTIHALATION AND FILTER LAYERS

Ludwig Max Coenen, Krefeld-Uerdingen, and Ottmar Wahl, Leverkusen-Bayerwerk, Germany, assignors to AGFA Aktiengesellschaft, Leverkusen, Germany, a corporation of Germany No Drawing. Application May 4, 1951
Serial No. 224,652

Claims priority, application Germany May 12, 1950

7 Claims. (Cl. 96—84)

The present invention relates to antihalation and filter layers for photographic materials.

It is known in the art to incorporate in filter layers or antihalation layers for photographic films or plates blue-green or green triphenyl methane dyestuffs derived from diphenylamine, which dyestuffs are bleached out in the alkaline developing solutions whereafter they may be dissolved out of the layers or together with the layers.

These dyestuffs as they are, for instance, described in United States Letters Patent Ser. No. 2,282,890, however, display the disadvantage that their instability in the presence of alkalies is so high as to bleach out, in part or totally, already when contacted with weakly alkaline, photographic emulsion layers the pH-value of which may be about 8. This contact occurs, for instance, when the colored layer is applied to the back of the photographic film, so that the colored layer is contacted with the emulsion layer when the film is reeled up.

In accordance with the present invention it has been found that the apparently contradictory requirements of bleaching out in the alkaline developing baths and of a sufficient resistance to alkalies when contacted with weakly alkaline emulsion layers are entirely met by triphenyl methane dyestuffs derived from diphenylamine, whose aromatic nuclei adjoining the central carbon atom are substituted, preferably at least in o-position to the central carbon atom, by substituents increasing the resistance to alkalies, such as alkyl, halogen or hydrocarbon nuclei condensed with said aromatic nuclei adjoining the central carbon atom, so that they change into the colorless form only at a relatively high pH-value, for instance, of at least 10. Such dyestuffs correspond to the general structural formula:

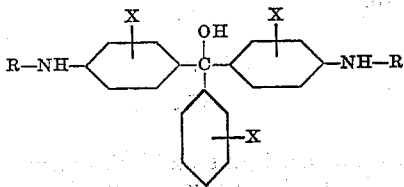

wherein R represents an aromatic nucleus, that may be substituted, and X represents alkyl groups, halogen atoms or parts of a hydrocarbon nucleus condensed with the benzene nuclei adjoining the central carbon atom, at least one X being present in at least one of the three benzene nuclei adjoining the central carbon atom, and the substitution has been effected preferably at least in o-position to the central carbon atom.

The production of the above defined triphenyl methane dyestuffs is accomplished by conventional methods, for instance, by condensing benzaldehydes, that may be substituted, with anisol or substitution products thereof, oxidizing the resulting triphenyl methane derivatives to form the corresponding carbinol and condensing these carbinols with aromatic amines to yield the corresponding dyestuffs.

The invention is further illustrated by the following examples without being restricted thereto.

Example 1

1–5 grams of dyestuff of the following formula:

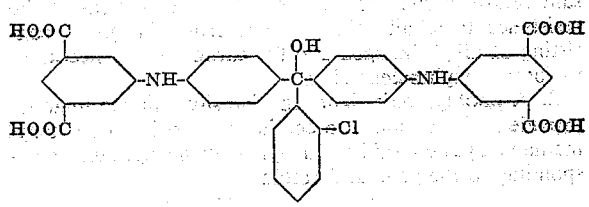

are dissolved in a 3% alcoholic solution of a synthetic binding agent which is soluble in alkali as, for instance, the condensation product of phenoxy acetic acid and p-cresol dialcohol and applied in this solution in known manner to the back of a photographic support. This antihalation layer is dissolved in the developing bath and the dyestuff is simultaneously bleached.

Example 2

1–5 grams of dyestuff of the following formula:

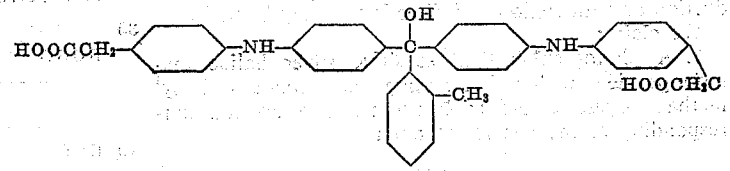

are dissolved in a 3% gelatin solution and, if necessary, after adding hardening agents, cast onto a photographic film support to form a layer upon which after drying one or more silver halide emulsion layers are applied which may be weakly alkaline. The colored layer thus obtained may be used as an antihalation layer or as a filter layer. Despite the use of weakly alkaline emulsions bleaching of the dyestuff is effected in the developing bath only. The dyestuff is not destroyed by the weakly alkaline emulsion, it is bleached out, however, by an alkaline developing solution.

Example 3

The dyestuffs described in Examples 1 and 2 may be replaced by the dyestuffs of the following formulae:

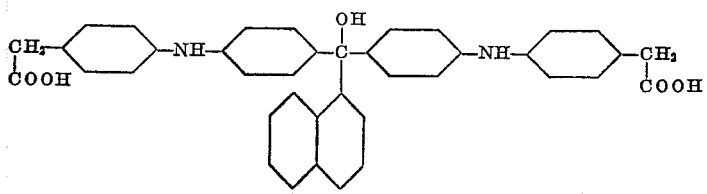

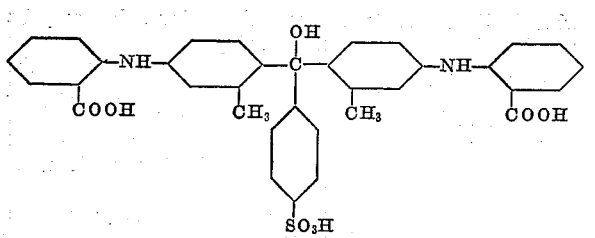

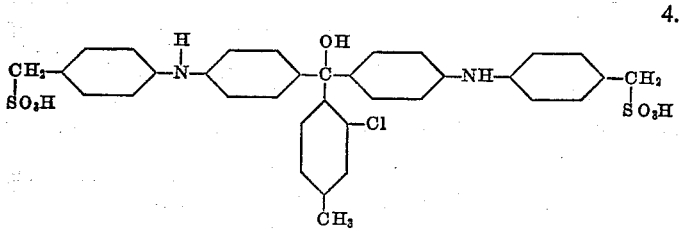

Instead of gelatin or the resin indicated in Example 1, any other binding agents usually employed in the production of antihalation and filter layers may be used.

We claim:

1. A photographic light sensitive silver halide material provided with a filter coating comprising a triphenyl methane dyestuff said triphenyl methane dyestuff corresponding to the general formula

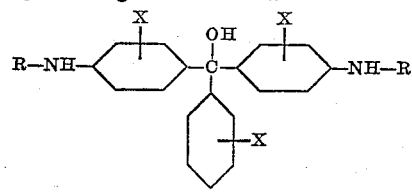

wherein R represents an aromatic nucleus carrying an acid group and X represents at least one substituent increasing the resistance to alkali, at least one X being present in at least one of the three benzene nuclei adjoining the central carbon atom in an ortho-position to said central carbon atom, said substituent increasing the resistance to alkali being selected from the group consisting of alkyl, halogen and the carbon atoms necessary to form a naphthalene ring.

2. A photographic light sensitive silver halide material provided with an antihalo coating comprising a triphenyl methane dyestuff said triphenyl methane dyestuff corresponding to the general formula

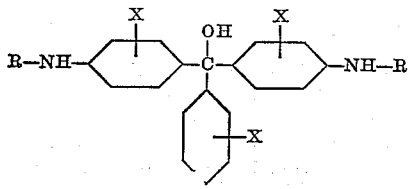

wherein R represents an aromatic nucleus carrying an acid group and X represents at least one substituent increasing the resistance to alkali, at least one X being present in at least one of the three benzene nuclei adjoining the central carbon atom in an ortho-position to said central carbon atom, said substituent increasing the resistance to alkali being selected from the group consisting of alkyl, halogen and the carbon atoms necessary to form a naphthalene ring.

3. A photographic light sensitive silver halide material provided with a filter coating comprising a dyestuff corresponding to the formula

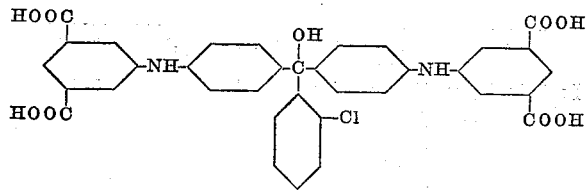

4. A photographic light sensitive silver halide material provided with an antihalation coating comprising a dyestuff corresponding to the formula

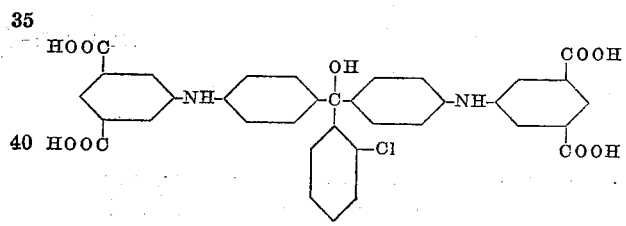

5. A photographic light sensitive silver halide material provided with a filter coating comprising a dyestuff corresponding to the formula

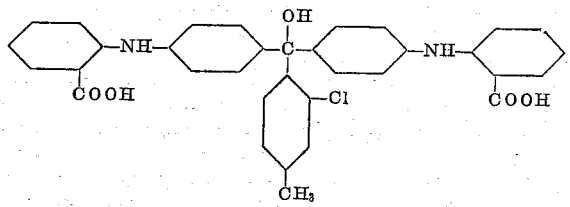

6. A photographic light sensitive silver halide material provided with an antihalation coating comprising a dyestuff corresponding to the formula

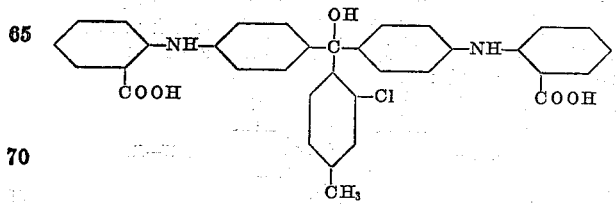

7. A photographic light sensitive silver halide material provided with a filter coating comprising a triphenyl methane dyestuff said triphenyl methane dyestuff corresponding to the general formula

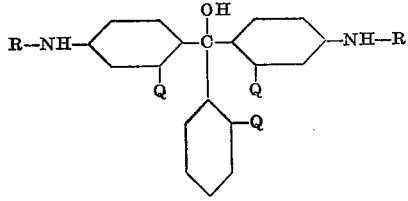

wherein R represents an aromatic nucleus carrying an acid group and at least one Q is selected from the group consisting of alkyl, halogen and fused aromatic nucleus groups whereby the dyestuff has enhanced resistance to alkali.

References Cited in the file of this patent

UNITED STATES PATENTS

| | | |
|---|---|---|
| 310,128 | Erlenmeyer | Dec. 30, 1884 |
| 567,567 | Herrmann | Sept. 8, 1896 |
| 676,555 | Hausdorfer | June 18, 1901 |
| 707,813 | Ach | Aug. 26, 1902 |
| 1,470,555 | Craver | Oct. 9, 1923 |
| 1,588,052 | Reyher | June 8, 1926 |
| 1,772,523 | Rodd et al. | Aug. 12, 1930 |
| 2,039,571 | Wahl | May 5, 1936 |
| 2,055,607 | Linch et al. | Sept. 29, 1936 |
| 2,083,888 | Winter et al. | June 15, 1937 |
| 2,098,891 | Schneider et al. | Nov. 9, 1937 |
| 2,282,890 | Schneider et al. | May 12, 1942 |

FOREIGN PATENTS

| | | |
|---|---|---|
| 446,583 | Great Britain | May 4, 1936 |
| 930,168 | France | Jan. 19, 1948 |

OTHER REFERENCES

Fierz-David et al.: Fundamental Processes of Dye Chemistry (1949), page 300. (Copy in Patent Office Library.)